(12) United States Patent
Williams et al.

(10) Patent No.: US 11,157,408 B2
(45) Date of Patent: Oct. 26, 2021

(54) CACHE SNOOPING MODE EXTENDING COHERENCE PROTECTION FOR CERTAIN REQUESTS

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US); Luke Murray, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/717,835

(22) Filed: Dec. 17, 2019

(65) Prior Publication Data

US 2021/0182197 A1 Jun. 17, 2021

(51) Int. Cl.
*G06F 12/08* (2016.01)
*G06F 12/0817* (2016.01)
(Continued)

(52) U.S. Cl.
CPC ...... *G06F 12/0828* (2013.01); *G06F 12/0842* (2013.01); *G06F 12/0891* (2013.01)

(58) Field of Classification Search
CPC ............. G06F 12/0828; G06F 12/0842; G06F 12/0891
See application file for complete search history.

(56) References Cited

U.S. PATENT DOCUMENTS 6,178,484 B1 1/2001 Arimilli et al.
6,633,959 B2 10/2003 Arimilli et al.
(Continued)

FOREIGN PATENT DOCUMENTS

EP 0261029 A2 3/1988

OTHER PUBLICATIONS

C. Fensch and M. Cintra, "An OS-based alternative to full hardware coherence on tiled CMPs," 2008 IEEE 14th International Symposium on High Performance Computer Architecture, Salt Lake City, UT, 2008, pp. 355-366.*
(Continued)

*Primary Examiner* — Pierre Miche Bataille
(74) *Attorney, Agent, or Firm* — Brian F. Russell; David Quinn

(57) ABSTRACT

A cache memory includes a data array, a directory of contents of the data array that specifies coherence state information, and snoop logic that processes operations snooped from a system fabric by reference to the data array and the directory. The snoop logic, responsive to snooping on the system fabric a request of a flush or clean memory access operation of an initiating coherence participant, determines whether the directory indicates the cache memory has coherence ownership of a target address of the request. Based on determining the directory indicates the cache memory has coherence ownership of the target address, the snoop logic provides a coherence response to the request that causes coherence ownership of the target address to be transferred to the initiating coherence participant, such that the initiating coherence participant can protect the target address against conflicting requests.

18 Claims, 8 Drawing Sheets

(51) Int. Cl.
*G06F 12/0842* (2016.01)
*G06F 12/0891* (2016.01)

(56) References Cited

U.S. PATENT DOCUMENTS

| | | | |
|---|---|---|---|
| 7,194,587 B2 | 3/2007 | McCalpin et al. | |
| 7,228,389 B2 | 6/2007 | Jones et al. | |
| 7,543,116 B2 | 6/2009 | Guthrie et al. | |
| 8,504,777 B2 | 8/2013 | Moyer | |
| 8,793,442 B2 | 7/2014 | Guthrie et al. | |
| 8,799,588 B2 | 8/2014 | Guthrie et al. | |
| 8,799,589 B2 | 8/2014 | Guthrie et al. | |
| 8,806,148 B2 | 8/2014 | Guthrie et al. | |
| 9,298,626 B2 | 3/2016 | Busaba et al. | |
| 9,298,665 B2 | 3/2016 | Pierson et al. | |
| 9,495,223 B2 | 11/2016 | Ebcioglu et al. | |
| 2007/0180196 A1* | 8/2007 | Guthrie | G06F 12/0822 711/141 |
| 2013/0262769 A1 | 10/2013 | Ghai et al. | |
| 2014/0201465 A1* | 7/2014 | Blaner | G06F 12/0831 711/143 |
| 2014/0201468 A1* | 7/2014 | Blaner | G06F 12/0817 711/146 |
| 2014/0379997 A1* | 12/2014 | Blaner | G06F 12/0831 711/146 |
| 2016/0321179 A1 | 11/2016 | Sara et al. | |
| 2017/0293559 A1 | 10/2017 | Guthrie et al. | |
| 2018/0011792 A1 | 1/2018 | Koker | |
| 2019/0018786 A1* | 1/2019 | Beard | G06F 12/1009 |

OTHER PUBLICATIONS

J. Stuecheli, B. Blaner, C. R. Johns and M. S. Siegel, "CAPI: A Coherent Accelerator Processor Interface," in IBM Journal of Research and Development, vol. 59, No. 1, p. 7:1-7:7, Jan.-Feb. 2015.*

A. Ros and S. Kaxiras, "Complexity-effective multicore coherence," 2012 21st International Conference on Parallel Architectures and Compilation Techniques (PACT), Minneapolis, MN, 2012, pp. 241-251.*

R. Titos-Gil, M. E. Acacio and J. M. García, "Efficient Eager Management of Conflicts for Scalable Hardware Transactional Memory, " in IEEE Transactions on Parallel and Distributed Systems, vol. 24, No. 1, pp. 59-71, Jan. 2013.*

Chaudhuri, M.; Cache Coherence (Architectural Supports for Efficient Shared Memory) 2017.

Anonymously; A Novel Method for Dynamic Management of Teams with Coherence Constraints, Jul. 17, 2019.

IBM; Atomic Final Cache State Transition for Snoop Filter Coherency, Feb. 5, 2007.

Anonymously; A Cache Coherence Mechanism to Forward Clean Lines, Mar. 25, 2004.

Marty, MR.; Cache Coherence Techniques for Multicore Processors, 2008.

Van Renen, A. et al.; Persistent Memory I/O Primitives, Jun. 2019.

IBM; Method and Apparatus for Cooperative State Prefetching in Clustered Shared Memory Multiprocessor Systems with Region Coherence Arrays, Mar. 17, 2009.

Williams et al., "Cache Snooping Mode Extending Coherence Protection for Certain Requests", Filing Date: Dec. 17, 2019 U.S. Appl. No. 16/717,835—Appendix P.

Williams, et al. "Cache Snooping Mode Extending Coherence Protection for Certain Requests", Filing Date: Dec. 3, 2019, U.S. Appl. No. 16/701,833—Notice of Allowance dated Dec. 1, 2020.

International application No. PCT/EP2020/085892, dated Dec. 14, 2020, International Search Report and Written Opinion dated Mar. 24, 2021.

* cited by examiner

CACHE SNOOPING MODE EXTENDING COHERENCE PROTECTION FOR CERTAIN REQUESTS

BACKGROUND OF THE INVENTION

The present invention relates generally to data processing and, in particular, to a cache snooping mode that extends coherence protection for flush/clean memory access requests that update system memory.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that are likely to be accessed by a processor in order to speed up processing by reducing access latency introduced by having to load needed data and instructions from system memory. In some MP systems, the cache hierarchy includes at least two levels. The level-one (L1) or upper-level cache is usually a private cache associated with a particular processor core and cannot be accessed by other cores in the MP system. Typically, in response to a memory access instruction such as a load or store instruction, the processor core first accesses the directory of the upper-level cache. If the requested memory block is not found in the upper-level cache, the processor core then access lower-level caches (e.g., level-two (L2) or level-three (L3) caches) for the requested memory block. The lowest-level cache (e.g., L2 or L3) can be shared by multiple processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor cores' "views" of the contents of system memory. In particular, cache coherency requires, at a minimum, that after a hardware thread accesses a copy of a memory block and subsequently accesses an updated copy of the memory block, the hardware thread cannot again access the old copy of the memory block.

Some MP systems support flush and clean operations, which cause a modified cache line associated with a target address of the flush or clean operation to be copied from a unique cache hierarchy containing the cache line in a coherence state indicating write authority (herein, sometimes referred to as an "HPC" state), if present, back to system memory. For a clean operation, the target cache line is also transitioned to an unmodified HPC coherence state. For a flush operation, a target cache line in an HPC state, whether modified or not, if present, is transitioned to an invalid coherence state. Flush operations additionally require any other copy or copies of the target cache line in a non-HPC state to be invalidated in all of the cache hierarchies of the MP system. This invalidation may not be complete when the cache holding the target cache line in the HPC state, if present, has completed its processing.

In MP systems that maintain coherency through a snoop-based coherence protocol, a flush or clean operation is generally broadcast on the system interconnect of the MP system and receives a Retry coherence response as long as the cache holding the target cache line in an HPC state has not completed processing of the flush or clean operation. Thus, the coherence participant that initiates the flush or clean operation may be required to reissue the flush or clean operation multiple times before the cache holding the target cache line in an HPC state, if present, has completed its processing of the flush or clean operation. When the cache that was holding the target cache line in the HPC state has completed processing of the flush or clean operation and if no new copy of the target cache line in an HPC state has yet been created (in a modified HPC state for a clean operation and in either a modified or unmodified HPC state for a flush operation), a subsequent issuance of the clean operation will receive a coherence response indicating success, and a subsequent issuance of the flush operation will receive either a coherence response indicating success (if no cached copy of the line then exists) or a coherence response transferring responsibility to invalidate any remaining non-HPC cached copies of the target cache line to the initiating coherence participant. In either of these cases for flush operations, the flush operation the operation can be considered as having "succeeded" in the sense that the flush operation has either fully finished or will finish once the remaining non-HPC copy or copies of the target cache line have been invalidated by the initiating coherence participant (e.g., through the issuance of kill operations). However, if prior to the subsequent issuance of the clean or flush operation another coherence participant creates a new copy of the target cache line in a relevant HPC state (i.e., in a modified HPC state for a clean operation and in either a modified or unmodified HPC state for a flush operation), the subsequent re-issuance of the flush or clean operation will be retried again, and the new copy of the target cache line in the HPC state will have to be processed, thus delaying successful completion of the flush or clean operation. This delay can be further exacerbated by continued creation of new HPC copies of the target cache line of the flush or clean operation.

BRIEF SUMMARY

In at least one embodiment, a target cache line of a flush or clean operation is protected from competing accesses from other coherence participants through a designated coherence participant providing a protection window for the target cache line.

In at least one embodiment, a cache memory includes a data array, a directory of contents of the data array that specifies coherence state information, and snoop logic that processes operations snooped from a system fabric by reference to the data array and the directory. The snoop logic, responsive to snooping on the system fabric a request of a flush or clean memory access operation of an initiating coherence participant, determines whether the directory indicates the cache memory has coherence ownership of a target address of the request. Based on determining the directory indicates the cache memory has coherence ownership of the target address, the snoop logic provides a coherence response to the request that causes coherence ownership of the target address to be transferred to the initiating coherence participant, such that the initiating coherence participant can protect the target address against conflicting requests.

DETAILED DESCRIPTION

Figure 1:
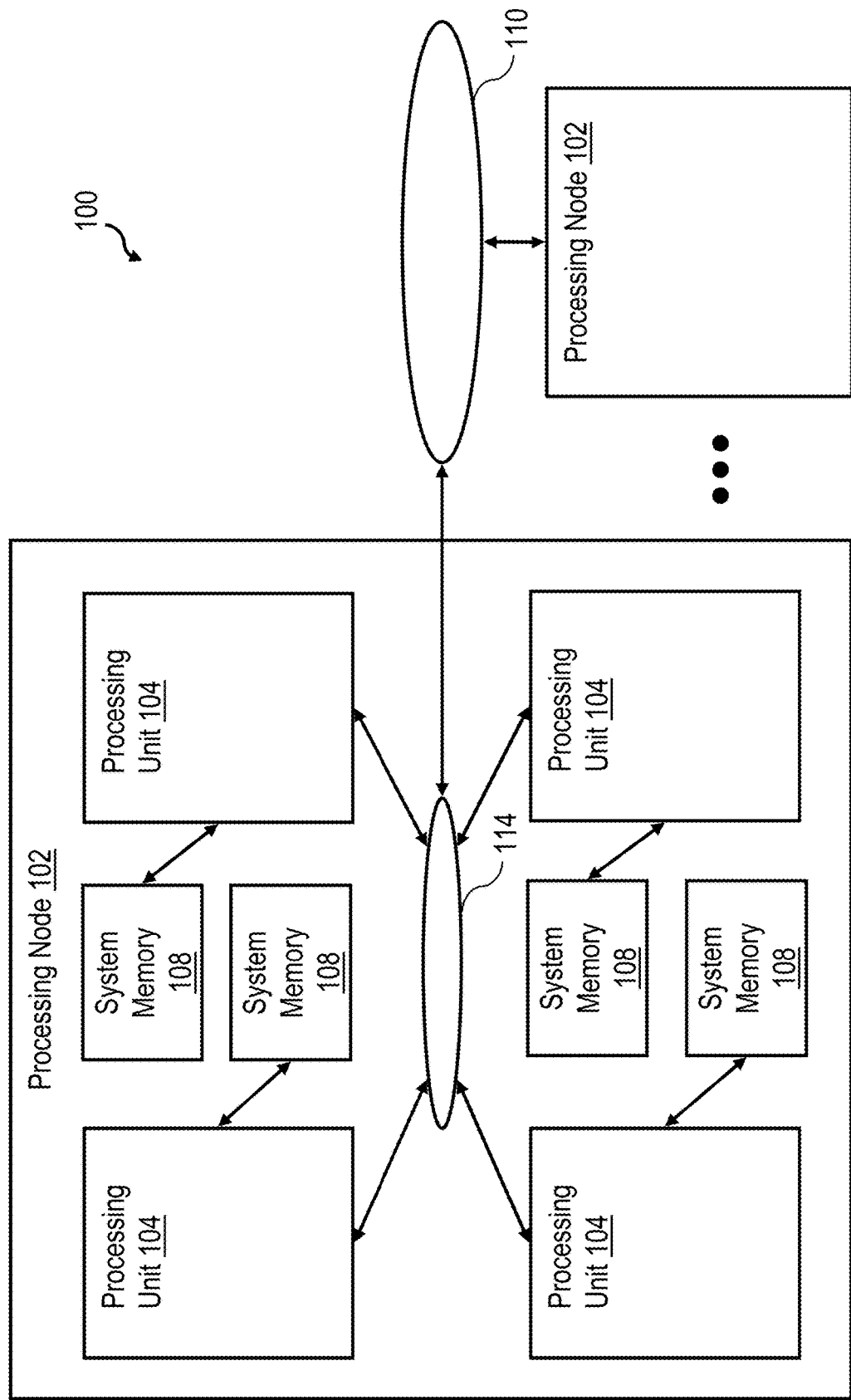
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high-level block diagram depicting an exemplary data processing system 100 in accordance with one embodiment. In the depicted embodiment, data processing system 100 is a cache coherent multiprocessor (MP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect, or a hybrid interconnect.

In the depicted embodiment, each processing node 102 is realized as a multi-chip module (MCM) containing four processing units 104, each preferably realized as a respective integrated circuit. The processing units 104 within each processing node 102 are coupled for communication with each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached, and modified by a processor core in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

Those skilled in the art will appreciate that MP data processing system 100 of FIG. 1 can include many additional non-illustrated components, such as interconnect bridges, non-volatile storage, ports for connection to networks, or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
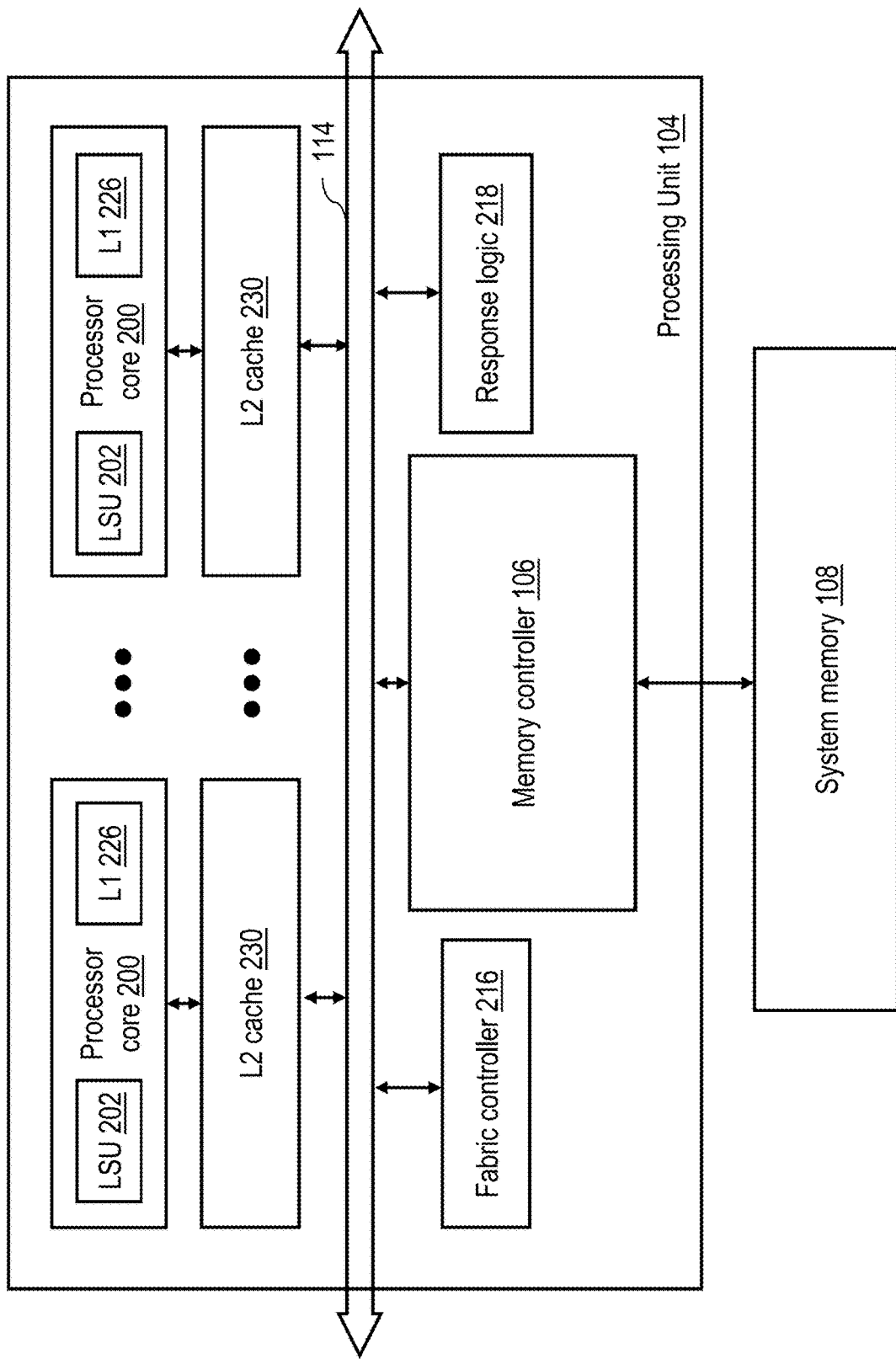
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including multiple processor cores 200 for processing instructions and data. Each processor core 200 includes one or more execution units for executing instructions, including an LSU 202 that executes memory access instructions that request access to a memory block or cause the generation of a request for access to a memory block. In at least some embodiments, each processor core 200 is capable of independently executing multiple hardware threads of execution simultaneously.

The operation of each processor core 200 is supported by a multi-level memory hierarchy having at its lowest level a shared system memory 108 accessed via an integrated memory controller 106. At its upper levels, the memory hierarchy includes one or more levels of cache memory, which in the illustrative embodiment include a store-through level-one (L1) cache 226 within and private to each processor core 200, and a respective store-in level-two (L2) cache 230 for each processor core 200. In order to efficiently handle multiple concurrent memory access requests to cacheable addresses, in some embodiments each L2 cache 230 can be implemented with multiple L2 cache slices, each of which handles memory access requests for a respective set of real memory addresses.

Although the illustrated cache hierarchies includes only two levels of cache, those skilled in the art will appreciate that alternative embodiments may include additional levels (e.g., L3, L4, etc.) of on-chip or off-chip in-line or lookaside cache, which may be fully inclusive, partially inclusive, or non-inclusive of the contents the upper levels of cache.

Still referring to FIG. 2, each processing unit 104 further includes an integrated and distributed fabric controller 216 responsible for controlling the flow of operations on local interconnect 114 and system interconnect 110 and response logic 218 for determining the coherence responses to memory access requests utilized in the selected cache coherency protocol.

In operation, when a hardware thread under execution by a processor core 200 includes a memory access instruction requesting a specified memory access operation to be performed, LSU 202 executes the memory access instruction to determine the target real address to be accessed. If the requested memory access cannot be performed entirely by reference to the L1 cache 226 of the executing processor core 200, the processor core 200 generates a memory access request, which includes, for example, at least a request type and a target real address, and issues the memory access request to its associated L2 cache 230 for processing.

Figure 3:
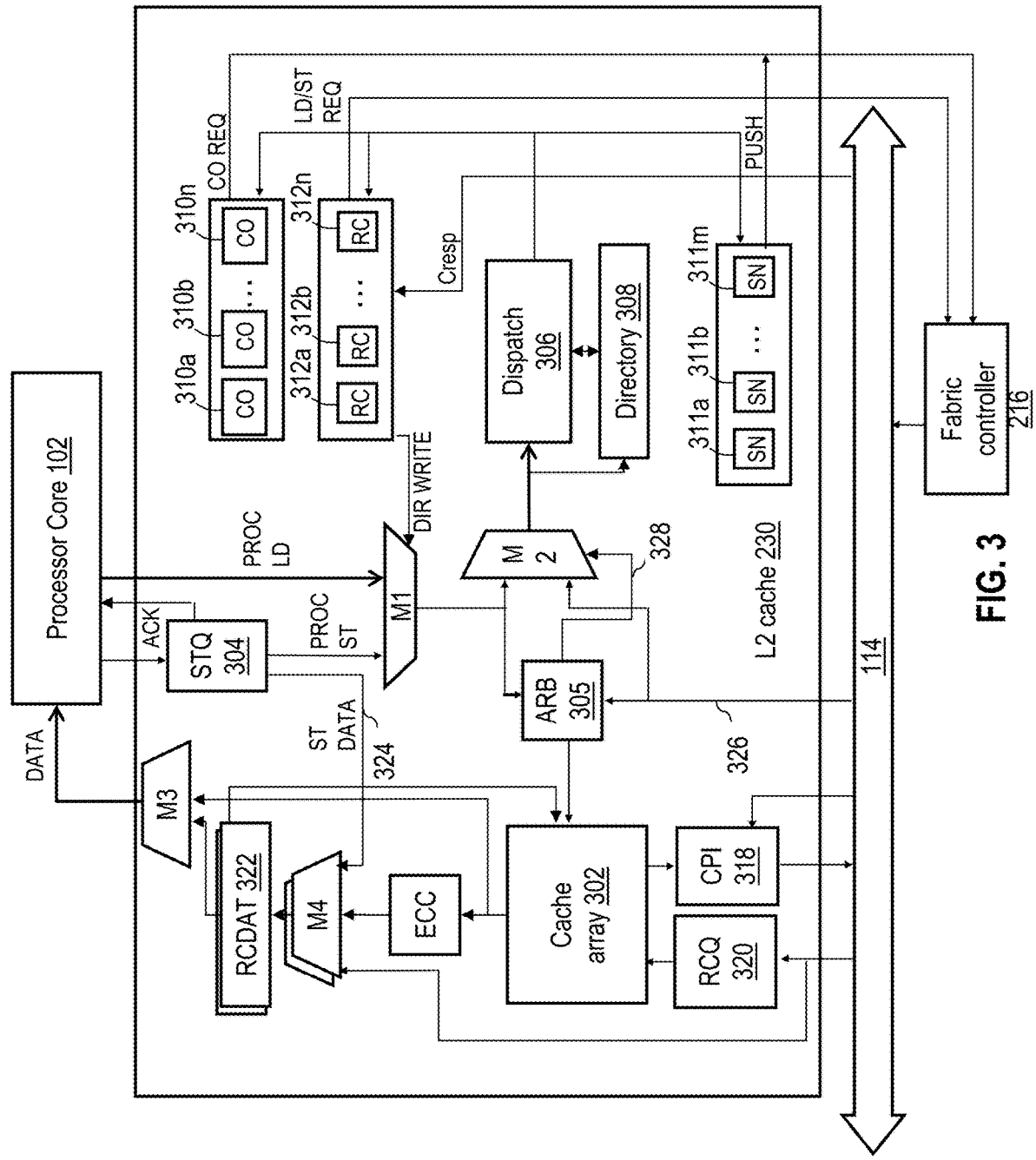
FIG. 3 is a detailed block diagram of a lower-level cache in accordance with one embodiment.

With reference now to FIG. 3, there is illustrated a more detailed block diagram of an exemplary embodiment of an L2 cache 230 in accordance with one embodiment. As shown in FIG. 3, L2 cache 230 includes a cache array 302 and a directory 308 of the contents of cache array 302. Assuming cache array 302 and directory 308 are set-associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicate the coherency state of the cache line, a LRU (Least Recently Used) field indicating a replacement order for the cache line with respect to other cache lines in the same congruence class, and an inclusivity field indicating whether the memory block is held in the associated L1 cache 226.

L2 cache 230 includes multiple (e.g., 16) Read-Claim (RC) machines 312a-312n for independently and concurrently servicing memory access requests received from the associated processor core 200. In order to service remote memory access requests originating from processor cores 200 other than the associated processor core 200, L2 cache 230 also includes multiple snoop (SN) machines 311a-311m. Each SN machine 311 can independently and concurrently handle a remote memory access request "snooped" from local interconnect 114. As will be appreciated, the servicing of memory access requests by RC machines 312 may require the replacement or invalidation of memory blocks within cache array 302. Accordingly, L2 cache 230 includes CO (castout) machines 310 that manage the removal and writeback of memory blocks from cache array 302.

L2 cache 230 further includes an arbiter 305 that controls multiplexers M1-M2 to order the processing of local memory access requests received from associated processor core 200 and remote requests snooped on local interconnect 114. Memory access requests are forwarded in accordance with the arbitration policy implemented by arbiter 305 to dispatch logic 306, which processes memory access requests with respect to directory 308 and cache array 302 over a given number of cycles.

L2 cache 230 also includes an RC queue (RCQ) 320 and a castout push intervention (CPI) queue 318 that respectively buffer data being inserted into and removed from the cache array 302. RCQ 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a respective one of CO machines 310 and SN machines 311, such that each CO machine 310 and each snooper 311 that is dispatched retrieves data from only the respective designated CPI buffer entry.

Each RC machine 312 also has assigned to it a respective one of multiple RC data (RCDAT) buffers 322 for buffering a memory block read from cache array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, processor store requests comprising a request type (ttype), target real address and store data are received from the associated processor core 200 within a store queue (STQ) 304. From STQ 304, the store data are transmitted to store data multiplexer M4 via data path 324, and the store type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

Figure 4:
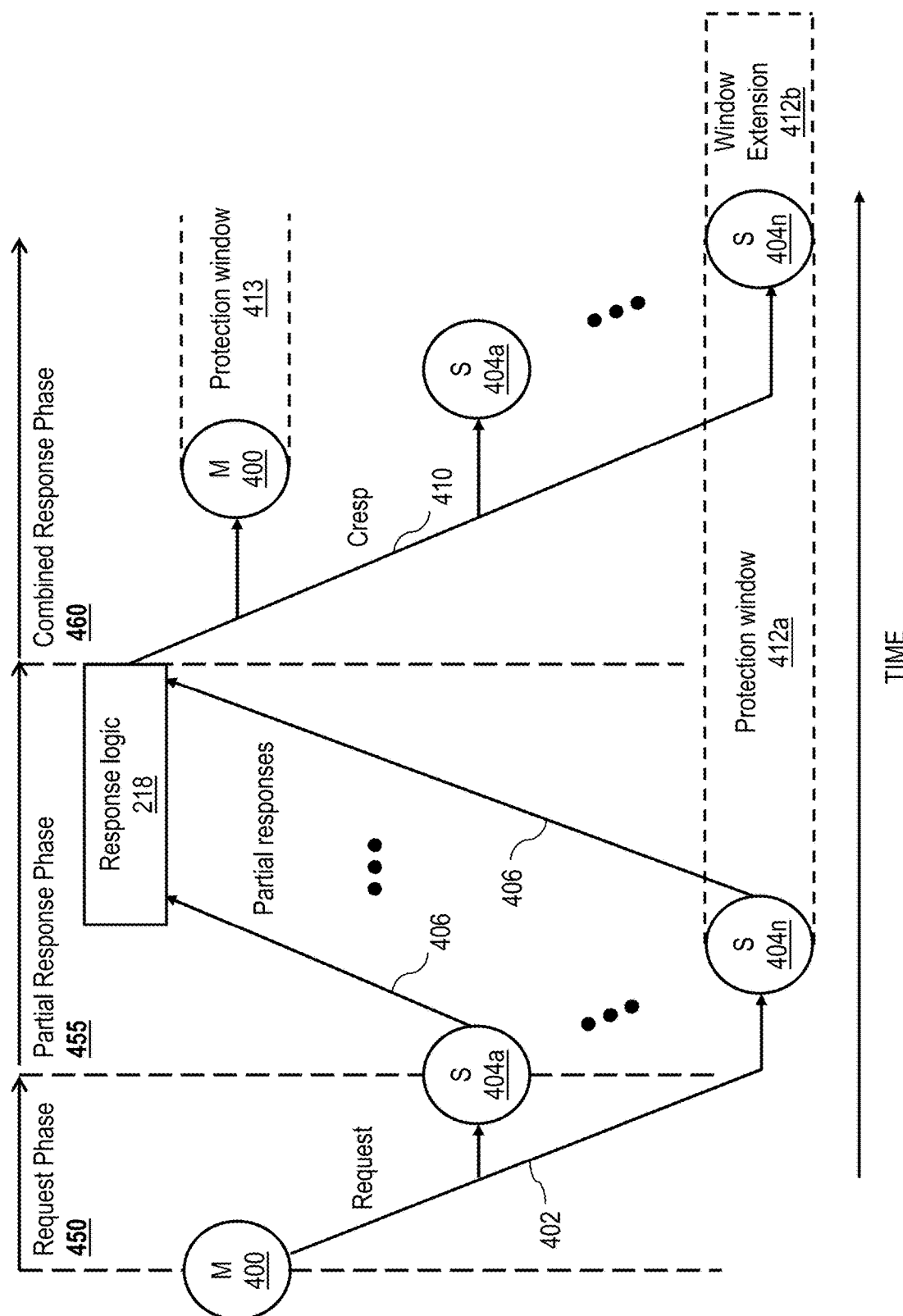
FIG. 4 is an exemplary timing diagram of a processor memory access operation in accordance with one embodiment.

Referring now to FIG. 4, there is depicted a time-space diagram of an exemplary operation on the system fabric of data processing system 100 of FIG. 1. It should be understood that numerous such operations will be in-flight on the system fabric at any given time and that multiple of these concurrent operations may, in some operating scenarios, specify conflicting target addresses.

The operation begins with a request phase 450 in which a master 400, for example, an RC machine 312 of an L2 cache 230, issues a request 402 on the system fabric. Request 402 preferably includes at least a request type indicating a type of desired access and a resource identifier (e.g., real address) indicating a resource to be accessed by the request. Requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBF (Data Cache Block Flush) | Requests flushing of any modified cached copy of the target memory block to system memory and destruction of all cached copies |
| DCBST (Data Cache Block Store) | Requests that any modified cached copy of a memory block be written into system memory |

TABLE I-continued

| Request | Description |
| --- | --- |
| AMO (Atomic Memory Operation) | Requests authority to cause memory controller to perform an atomic update to a memory block in system memory; requires any modified cached copy of a memory block to be written into system memory and the destruction all cached copies, if any |
| CASTOUT | Copies the image of a memory block from a higher level of memory to a lower level of memory in preparation for the destruction of the higher level copy |
| WRITE | Requests destruction of cached copies, if any, of a memory block and authority to update the memory block in system memory |
| BACKGROUND KILL (BK) | Cleanup command for an AMO request that causes invalidation of all cache copies of a memory block |
| BK_FLUSH | Cleanup command for a DCBF request that causes invalidation of all cache copies of a memory block |
| CLEAN_ACK | Acknowledges assumption by coherence participant of HPC status for memory block |

Request 402 is received by snoopers 404a-404n distributed in data processing system 100, for example, SN machines 311a-311m of L2 caches 230 and unillustrated snoopers in memory controllers 106. For read-type requests, SN machines 311 in the same L2 cache 230 as the master 400 of request 402 do not snoop request 402 (i.e., there is generally no self-snooping) because a request 402 is transmitted on the system fabric only if the read-type request 402 cannot be serviced internally by a processing unit 104. For other types of requests 402, however, such as flush/clean requests (e.g., the DCBF, DCBST, AMO requests listed in Table I), SN machines 311 in the same L2 cache 230 as the master 400 of request 402 do self-snoop the requests 402.

The operation continues with a partial response phase 455. During partial response phase 455, snoopers 404 that receive and process requests 402 each provide a respective partial response ("Presp") 406 representing the response of at least that snooper 404 to request 402. A snooper 404 within an integrated memory controller 106 determines the partial response 406 to provide based, for example, upon whether that snooper 404 is responsible for the request address and whether it has resources currently available to service the request. A snooper 404 of an L2 cache 230 may determine its partial response 406 based on, for example, the availability of its L2 cache directory 308, the availability of a snoop logic instance 311 within the snooper 404 to handle the request, and the coherence state, if any, associated with the request address in L2 cache directory 308.

The operation continues with a combined response phase 460. During combined response phase 460, partial responses 406 of snoopers 404 are logically combined either in stages or all at once by one or more instances of response logic 218 to determine a system-wide combined response ("Cresp") 410 to request 402. In one preferred embodiment, which will be assumed hereinafter, the instance of response logic 218 responsible for generating combined response 410 is located in the processing unit 104 containing the master 400 that issued request 402. Response logic 218 provides combined response 410 to master 400 and snoopers 404 via the system fabric to indicate the system-wide response (e.g., Success, Retry, etc.) to request 402. If the Cresp 410 indicates success of request 402, Cresp 410 may indicate, for example, a data source for a requested memory block (if applicable), a coherence state in which the requested memory block is to be cached by master 400 (if applicable), and whether "cleanup" operations invalidating cached copies of the requested memory block in one or more L2 caches 230 are required (if applicable).

In response to receipt of combined response 410, one or more of master 400 and snoopers 404 typically perform one or more operations in order to service request 402. These operations may include supplying data to master 400, invalidating or otherwise updating the coherency state of data cached in one or more L2 caches 230, performing castout operations, writing back data to a system memory 108, etc. If required by request 402, a requested or target memory block may be transmitted to or from master 400 or one of snoopers 404 before or after the generation of combined response 410 by response logic 218.

In the following description, the partial response 406 of a snooper 404 to a request 402 and the operations performed by the snooper 404 in response to the request 402 and/or its combined response 410 will be described with reference to whether that snooper is a Highest Point of Coherency (HPC), a Lowest Point of Coherency (LPC), or neither with respect to the request address specified by the request. An LPC is defined herein as a memory device or I/O device that serves as the ultimate repository for a memory block. In the absence of a caching participant that holds a copy of the memory block, the LPC holds the only image of that memory block. In the absence of an HPC caching participant for the memory block, the LPC has the sole authority to grant or deny requests to modify the memory block. In addition, an LPC, when the LPC data is current and in the absence of a caching participant that can provide the data, provides that data to requests to either read or modify the memory block. If a caching participant has a more current copy of the data, but is unable to provide it to a request, the LPC does not provide stale data and the request is retried. For a typical request in the embodiment of data processing system 100 given in FIGS. 1-3, the LPC will be the memory controller 106 for the system memory 108 holding the referenced memory block.

An HPC is defined herein as a uniquely identified device that caches a true image of the memory block (which may or may not be consistent with the corresponding memory block at the LPC) and has the authority to grant or deny a request to modify the memory block. Descriptively, the HPC (even if its copy is consistent with main memory behind the LPC) also provides a copy of the memory block to a requestor in response to any request to read or modify the memory block (cache-to-cache transfers are faster than LPC-to-cache transfers). Thus, for a typical request in the data processing system embodiment, the HPC, if any, will be an L2 cache 230. Although other indicators may be utilized to designate an HPC for a memory block, a preferred embodiment designates the HPC, if any, for a memory block utilizing selected cache coherence state(s) within the L2 cache directory 308 of an L2 cache 230. In a preferred embodiment, the coherence states within the coherency protocol, in addition to providing (1) an indication of whether a cache is the HPC for a memory block, also indicate (2) whether the cached copy is unique (i.e., is the only cached copy system-wide), (3) whether and when relative to the phases of the operation the cache can provide a copy of the memory block to a master of a request for the memory block, and (4) whether the cached image of the memory block is consistent with the corresponding memory block at the LPC (system memory). These four attributes can be expressed, for example, in an exemplary variant of the well-known MESI (Modified, Exclusive, Shared, Invalid) protocol summarized below in Table II. Further information regarding the coherency protocol may be found, for example, in U.S. Pat. No. 7,389,388, which is hereby incorporated by reference.

TABLE II

| Cache state | HPC? (write authority) | Consistent with LPC? | Unique? | Data source? | Legal concurrent states |
|---|---|---|---|---|---|
| M | Yes | No | yes | Yes, before CR | I (& LPC) |
| Me | Yes | Yes | yes | Yes, before CR | I (& LPC) |
| T | Yes | No | unknown | Yes, after CR if none provided before CR | $S_L$, S, I (& LPC) |
| Te | Yes | Yes | unknown | Yes, after CR if none provided before CR | $S_L$, S, I (& LPC) |
| $S_L$ | No | unknown | unknown | Yes, before CR | T, S, I (& LPC) |
| S | No | unknown | unknown | No | T, $S_L$, S, I (& LPC) |
| I | No | n/a | n/a | No | M, Me, T, $S_L$, S, I (& LPC) |

Of note in Table II above are the T, Te, $S_L$ and S states, which are all "shared" coherency states in that a cache memory may contemporaneously hold a copy of a cache line held in any of these states by another cache memory. The T or Te state identifies an HPC cache memory that formerly held the associated cache line in one of the M or Me states, respectively, and sourced a query-only copy of the associated cache line to another cache memory. As an HPC, a cache memory holding a cache line in the T or Te coherence state has the authority to modify the cache line or to give such authority to another cache memory. A cache memory holding a cache line in a Tx state (e.g., T or Te) serves as the cache data source of last resort (after Cresp) for query-only copies of that cache line in that the cache memory will only source a query-only copy to another cache memory if no cache memory holding the cache line in the $S_L$ state is available to serve as a data source (before Cresp).

The $S_L$ state is formed at a cache memory in response to that cache memory receiving a query-only copy of a cache line from a cache memory in the T coherence state. Although the $S_L$ state is not an HPC coherence state, a cache memory holding a cache line in the $S_L$ state has the ability to source a query-only copy of that cache line to another cache memory and can do so prior to receipt of Cresp. In response to sourcing a query-only copy of a cache line to another cache memory (which assumes the $S_L$ state), the cache memory sourcing the query-only copy of the cache line updates its coherency state for the cache line from $S_L$ to S. Thus, implementation of the $S_L$ coherence state can cause numerous query-only copies of frequently queried cache lines to be created throughout a multiprocessor data processing system, advantageously decreasing latencies of query-only access to those cache lines.

Referring again to FIG. 4, the HPC, if any, for a memory block referenced in a request 402, or in the absence of an HPC, the LPC of the memory block, preferably has the responsibility of protecting the transfer of coherence ownership of a memory block, if necessary, in response to a request 402. In the exemplary scenario shown in FIG. 4, a snooper 404n at the HPC (or in the absence of an HPC, the LPC) for the memory block specified by the request address of request 402 protects the transfer of coherence ownership of the requested memory block to master 400 during a protection window 412a that extends from the time that snooper 404n determines its partial response 406 until snooper 304n receives combined response 410 and during a subsequent window extension 412b extending a programmable time beyond receipt by snooper 404n of combined response 410. During protection window 412a and window extension 412b, snooper 404n protects the transfer of ownership by providing partial responses 406 to other requests specifying the same request address that prevent other masters from obtaining ownership (e.g., a Retry partial response) until ownership has been successfully transferred to master 400. Master 400 can likewise initiate a protection window 413 to protect its coherence ownership of the memory block requested in request 402 following receipt of combined response 410.

Because snoopers 404 all have limited resources for handling the CPU and I/O requests described above, several different levels of Presps and corresponding Cresps are possible. For example, if a snooper within a memory controller 106 that is responsible for a requested memory block has a queue available to handle a request, the snooper may respond with a partial response indicating that it is able to serve as the LPC for the request. If, on the other hand, the snooper has no queue available to handle the request, the snooper may respond with a partial response indicating that it is the LPC for the memory block, but is unable to currently service the request. Similarly, a snooper 311 in an L2 cache 230 may require an available instance of snoop logic and access to L2 cache directory 406 in order to handle a request. Absence of access to either (or both) of these resources results in a partial response (and corresponding Cresp) signaling an inability to service the request due to absence of a required resource.

As discussed above, in systems implementing a snoop-based coherence protocol, flush operations (e.g., DCBF and AMO) and clean operations (e.g., DCBST) can be subject to forward progress concerns. As described in detail below with reference to FIGS. 5-7, these forward progress concerns can be addressed by a coherence participant having coherence ownership of the target cache line (i.e., the HPC) transferring coherence ownership of the target cache line to the coherence participant that initiated the flush or clean operation, thus enabling the initiating coherence participant to begin its protection window for the target cache line earlier than was permitted in the prior art.

Figure 5:
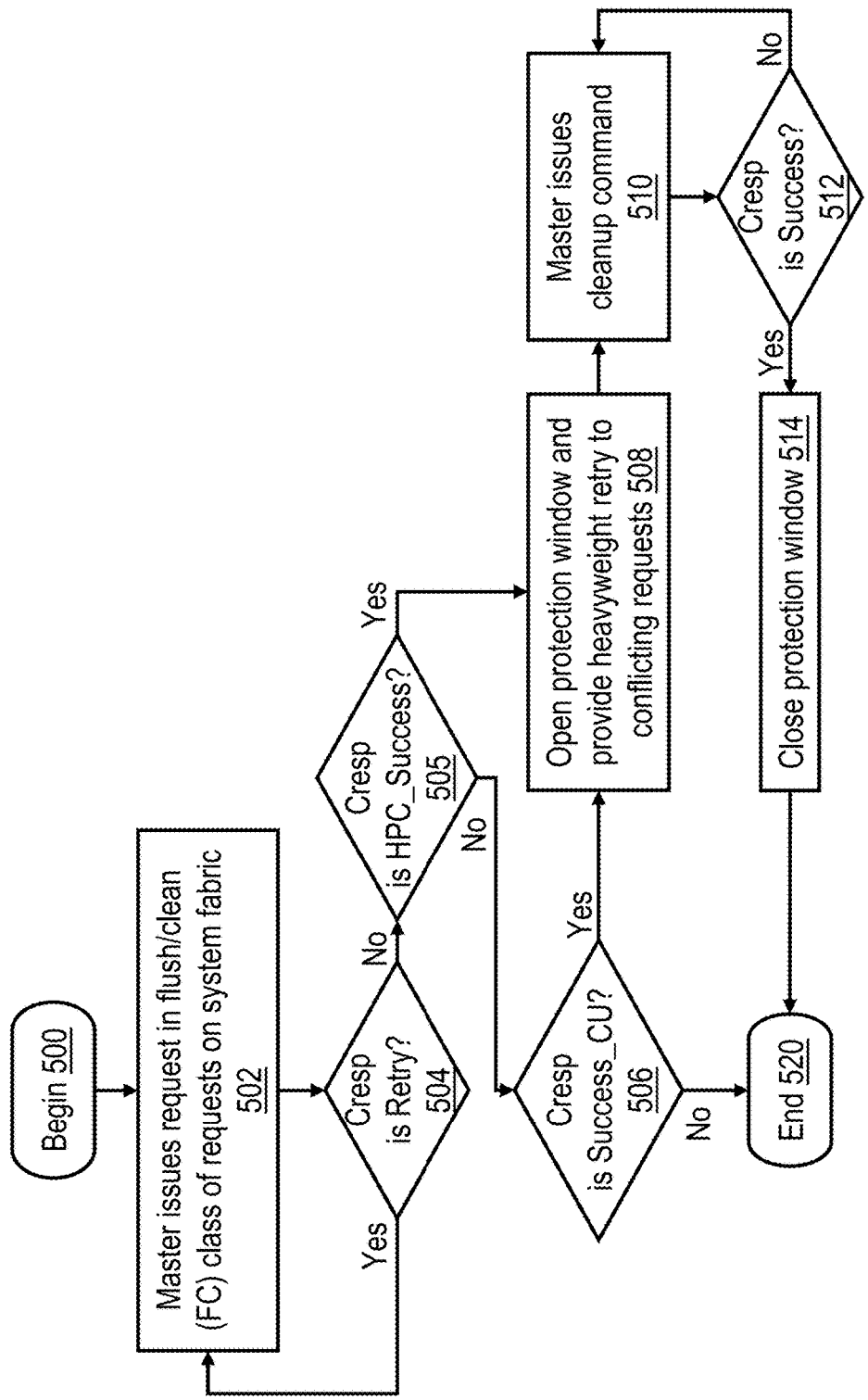
FIG. 5 is a high-level logical flowchart of an exemplary process by which a processing unit performs a flush/clean memory access operation in accordance with one embodiment.

Turning now to FIG. 5, there is illustrated a high-level logical flowchart of an exemplary process by which a master 400 (e.g., an RC machine 312) in an initiating processing unit 104 performs a flush or clean type of memory access operation in accordance with one embodiment. As indicated above, any number of masters may concurrently perform their own respective flush/clean memory access operations to possibly conflicting target addresses. Consequently, multiple instances of the process given in FIG. 5 may be performed within data processing system 100 in a temporally overlapping manner.

The process of FIG. 5 begins at block 500 and then proceeds to block 502, which illustrates a master 400 issuing on the system fabric of data processing system 100 a request 402 of a memory access operation. In at least some embodiments, a master 400, such as an RC machine 312 of an L2 cache 230, issues the request 402 in response to receiving a memory access request from the associated processor core 200 based on execution of a corresponding instruction by LSU 202. In the described embodiment, the request 402 initiates a memory access operation belonging to one of several classes or types of operations generally referred to collectively herein as flush/clean (FC) operations. These FC operations, which include the DCBF, DCBST, and AMO operations referenced in Table I, are all storage-modifying operations that require any modified cached copy of a target memory block to be written back to the relevant system memory 108.

As made clear in the preceding discussion of FIG. 4, the FC request 402 of the master 400 is received on the system fabric by L2 caches 230 and memory controllers 106 distributed within data processing system 100. In response to receipt of FC request 402, these various snoopers 404 generate their respective partial responses 406 and communicate the partial responses 406 to the relevant instance of response logic 218. In an exemplary embodiment, an L2 cache 230 responds to snooping FC request 402 with one of three Presps: (1) heavyweight Retry, (2) lightweight Retry, or (3) Null. A heavyweight Retry Presp is provided by an L2 cache 230 that is currently unable to access the coherence state of the target address of the FC request 402 in its directory 308. In addition, a heavyweight Retry Presp is also provided by an L2 cache 230 that is designated by the coherence state in its directory 308 as the HPC for the target address, but that is unable to respond to the FC request 402 at this time or that is currently busy processing a request for the target cache line.

A lightweight Retry Prep is provided by a L2 cache 230 whose directory 308 is accessible and indicates either of the $S_L$ and S states for the target address and (1) is currently processing another conflicting request for the target address or (2) is unable to dispatch a SN machine 311 and no SN machine 311 is currently active for the target address or (3) has already dispatched a SN machine 311 to process the FC request 402.

It should be appreciated that, for the entire interval an L2 cache 230 has a SN machine 311 active processing a request for a given target address, the L2 cache 230 will provide a heavyweight Retry Presp or lightweight Retry Presp based on the coherence state associated with the target address when a request was first snooped. The specific actions performed by an L2 cache 230 that holds the target address of the FC request 402 in a dirty (e.g., M or T) HPC coherence state are described in detail below with reference to FIG. 6. The actions performed by an L2 cache 230 that holds the target address of a flush request in a shared (e.g., Te, $S_L$, or S) coherence state are described in detail below with reference to FIG. 7.

In response to snooping the FC request 402, a memory controller 106 not responsible for the target address (i.e., not the LPC) will provide no Presp (or a Null Presp). The memory controller 106 that is the LPC memory controller for the target address of FC request 402 provides a Retry_LPC Presp if the memory controller 106 is unable to service the FC request 402 due to either resource constraints or due to the memory controller 106 already servicing another memory access request specifying the same address. If the LPC memory controller 106 is able to service the FC request 402, the LPC memory controller 106 protects the target address of the FC request 402 by providing LPC_Retry Presps to any subsequent FC operations (or other operations) until it receives a successful Cresp for the originally snooped FC request 402.

Referring again to FIG. 5, the process proceeds from block 502 to blocks 504, 505, and 506, which illustrate the master 400 of the request 402 of the FC operation issued at block 502 awaiting receipt of the corresponding Cresp 410 from response logic 218. In at least one embodiment, response logic 218 can generate the Cresp 410 for the FC operation based on the received Presps of the snoopers 404 as shown in Table III below. It should be noted that in at least some embodiments, a DCBST request does not receive a lightweight Retry Presp (as shown in rows 1, 2, 3 and 5 of Table III) because DCBST requests are ignored by caches holding the target cache line in either of the $S_L$ and S states.

TABLE III

| HPC_Ack | Heavyweight Retry | Lightweight Retry | Retry_LPC | Cresp | Comment |
|---|---|---|---|---|---|
| 1 | X | X | X | HPC_Success | HPC hands off coherence ownership to master initiating FC request |
| 0 | 1 | X | X | Retry | Flushing request did not succeed because there is or might be an HPC cache that did not process the flushing request |
| 0 | 0 | 1 | 1 | Retry | LPC did not select this flushing request to |

TABLE III-continued

| HPC_Ack | Heavyweight Retry | Lightweight Retry | Retry_LPC | Cresp | Comment |
|---|---|---|---|---|---|
| | | | | | succeed; shared cached copies of the target cache line may exist |
| 0 | 0 | 0 | 1 | Retry | Absence of heavyweight and lightweight Retry Presps indicates that no cached copies of target cache line exist; LPC has already selected another competing operation to succeed |
| 0 | 0 | 1 | 0 | Success_CU | LPC selected this request to succeed; shared cached copies of target cache line need to be invalidated; absence of heavyweight Retry indicates master can take HPC authority and retry any conflicting requests while it invalidates any remaining shared cached copies by issuing a "clean up" command. |
| 0 | 0 | 0 | 0 | Success | LPC selected this request to succeed; no cached copy of the target cache line exists |

In response to receipt of Cresp 410, master 400 determines whether Cresp 410 indicates Retry, as shown in the second, third, and fourth rows of Table III (block 504). If so, the process returns to block 502, which illustrates master 400 re-issuing the request 402 of the FC operation on the system fabric. If master 400 determines at block 504 that the Cresp 410 of the request 402 is not Retry, then in the embodiment of Table III the coherence result is either HPC_Success (first row of Table III), Success_with_cleanup (Success_CU) (fifth row of Table III), or Success (sixth row of Table III). If the Cresp 410 is Success (as indicated by negative determinations at both of blocks 505 and 506), either no cached copy of the target cache line is present in the data processing system (for a flushing operation) or no dirty cached copy of the target cache line is present in the data processing system (for a clean operation). In either case, the flush or clean operation completed successfully, and the process of FIG. 5 ends at 520.

Returning to blocks 505-506, if Cresp 410 indicates HPC_Success or Success_CU, master 400 assumes coherence ownership of the target cache line and opens a protection window 413 in which master 400 protects the target address by causing any conflicting snooped request to receive a heavyweight Retry (block 508). In addition, master 400 issues a cleanup command on the system fabric to cause any modified cached copy of the target memory block residing at an HPC cache to be written back to system memory 108 (block 510). Depending on the type of the request 402, the cleanup command may additionally cause any other cached copy or copies of the target memory block to be invalidated, as with the BK and BK_Flush commands included in Table II. Following block 510, the process of FIG. 5 passes to block 512, which illustrates a determination of whether the Cresp 410 of the cleanup command indicates Success. If not, the process returns to block 510, which represents master 400 re-issuing the cleanup command. Once a Cresp 410 indicating Success is received for the cleanup command issued at block 510, master 400 closes protection window 413 and thus ends protection for the target address (block 514), Thereafter, the process of FIG. 5 ends at block 520.

Figure 6:
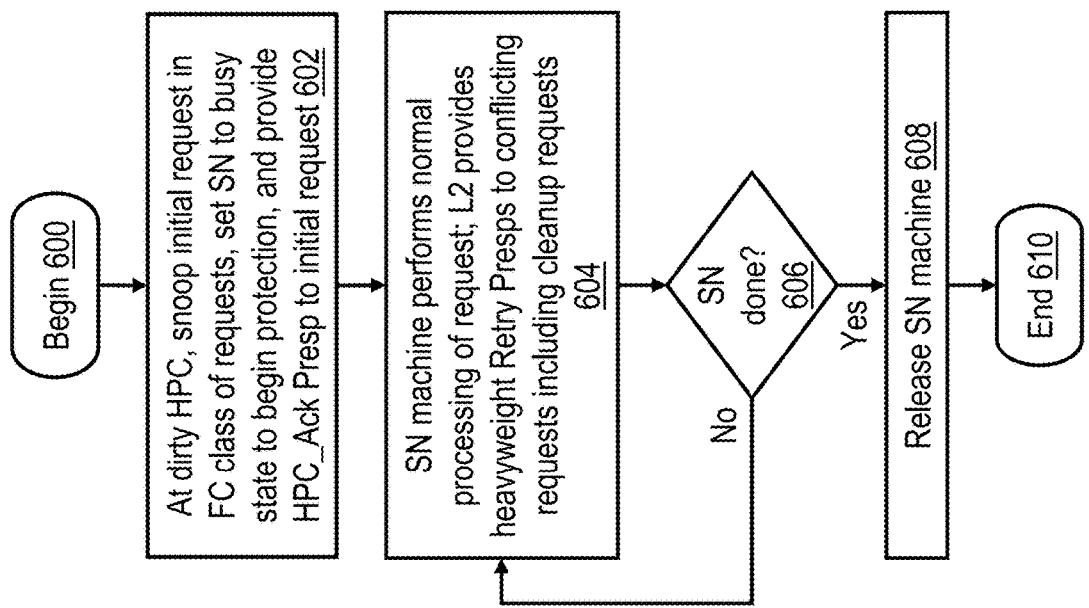
FIG. 6 is a high-level logical flowchart of an exemplary process by which a cache having coherence ownership of a target cache line of a snooped flush or clean type request handles the request in accordance with one embodiment.

Referring now to FIG. 6, there a high-level logical flowchart of an exemplary process by which a dirty HPC cache handles a snooped request of an FC memory access operation in accordance with one embodiment. The method of FIG. 6 focuses on the cache, if present, that holds a copy of the target cache line of the FC memory access request in a dirty HPC coherence state because any cache that holds a copy of the target cache line in a non-dirty HPC coherence state simply either ignores the request (if a clean request) or invalidates its copy of the target cache line (if a flushing request).

The process depicted in FIG. 6 begins at block 600 and then proceeds to block 602, which illustrates an L2 cache memory 230 that holds a target cache line of a FC memory access operation in a dirty HPC coherence state (e.g., M or T coherence state) snooping the request of the FC memory access operation from local interconnect 114. The FC memory access operation may be, for example, a DCBF, DCBST, or AMO operation as previously described or any other storage-modifying FC operation that requires modified cached data to be written back to system memory 108. In response to snooping the request of the FC memory access operation, the L2 cache memory 230 allocates a SN machine 311 to service the FC memory access operation and sets the SN machine 311 to a busy state so that the SN machine 311 begins to protect the target real address specified by the request. In addition, the L2 cache memory 230 provides an HPC_Ack Presp to the initial request of the FC memory access operation to signal that coherence ownership is to be transferred to the master of the FC memory access operation.

While the SN machine 311 is in the busy state, SN machine 311 performs normal processing for the snooped request (block 604). This normal processing includes writing back modified data of the target cache line to the relevant system memory 108 via the system fabric and, when the update of system memory 108 is complete, invalidating the target cache line in the local directory 308, if required by the FC request 402. In addition, as further illustrated at block 604, while the SN machine 311 is in the busy state, the L2 cache 230 provides a heavyweight Retry partial response to any snooped request that requests accesses the target cache line. The heavyweight Retry partial response causes the relevant instance of response logic 218 to form a Retry Cresp 410 that forces the master of the conflicting request to reissue its request.

As indicated at block 606, the processing at block 604 continues until processing of the snooped FC request by SN machine 311 is complete. In response to a determination being made at block 606 that the processing of the snooped FC request by SN machine 311 is complete, the process of FIG. 6 ends at block 610.

Those skilled in the art will appreciate that FIG. 6 discloses a technique in which a dirty HPC snooper of a request of a FC memory access operation transfers coherence ownership of the target cache line of the request to a master of the request, which can then provide coherence protection for the target cache line. In this way, no vulnerability window is formed between the end of flush/clean activities performed by the HPC snooper and acceptance of the request for processing at the LPC. As a result, no other HPC will be formed for the target cache line until the FC memory access operation is guaranteed to succeed.

Figure 7:
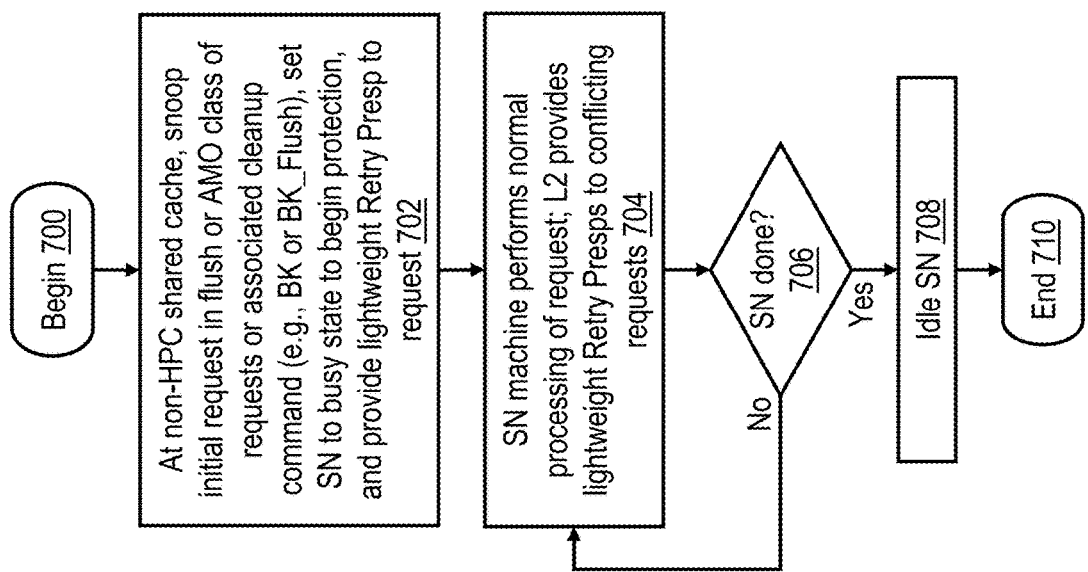
FIG. 7 is a high-level logical flowchart of an exemplary process by which a cache holding a non-HPC shared copy of a target cache of a snooped flush type request handles the request in accordance with one embodiment.

Referring now to FIG. 7, there is depicted a high-level logical flowchart of an exemplary process by which a cache holding a non-HPC shared copy of a target cache of a snooped flush-type request (e.g., DCBF or AMO) handles the request in accordance with one embodiment. It should be noted that clean requests are ignored by caches holding a shared copy of a target cache of a clean (e.g., DCBST) request.

The process of FIG. 7 begins at block 700 and then proceeds to block 702, which illustrates an L2 cache 230 that holds the target cache line of a flush-type request snooping an initial request of a flush-type operation (e.g., DCBF or AMO) or an associated cleanup command (e.g., BK or BK_FLUSH). In response to snooping the initial request or cleanup command, the L2 cache 230 provides a lightweight Retry response. In addition, in response to the initial request the L2 cache 230 allocates a SN machine 311 to handle the initial request. The allocated SN machine 311 transitions from an idle state to a busy state and begins to protect the target cache line.

At block 704, the SN machine 311 allocated to handle the request snooped at block 802 performs normal processing for the initial request or cleanup command by invalidating the target cache line in the local directory 308. As further illustrated at block 704, while the SN machine 311 is in the busy state, the L2 cache 230 provides a lightweight Retry partial response to any snooped request that requests accesses the target cache line. A determination is made at block 706 whether or not processing of the snooped request by the SN machine 311 is complete. If not, the process of FIG. 7 returns to block 704, which has been described. If, however, a determination is made that the processing of the snooped request by the SN machine 311 is complete, the SN machine 311 returns to an idle state (block 708), and the process of FIG. 7 ends at block 710.

Figure 8:
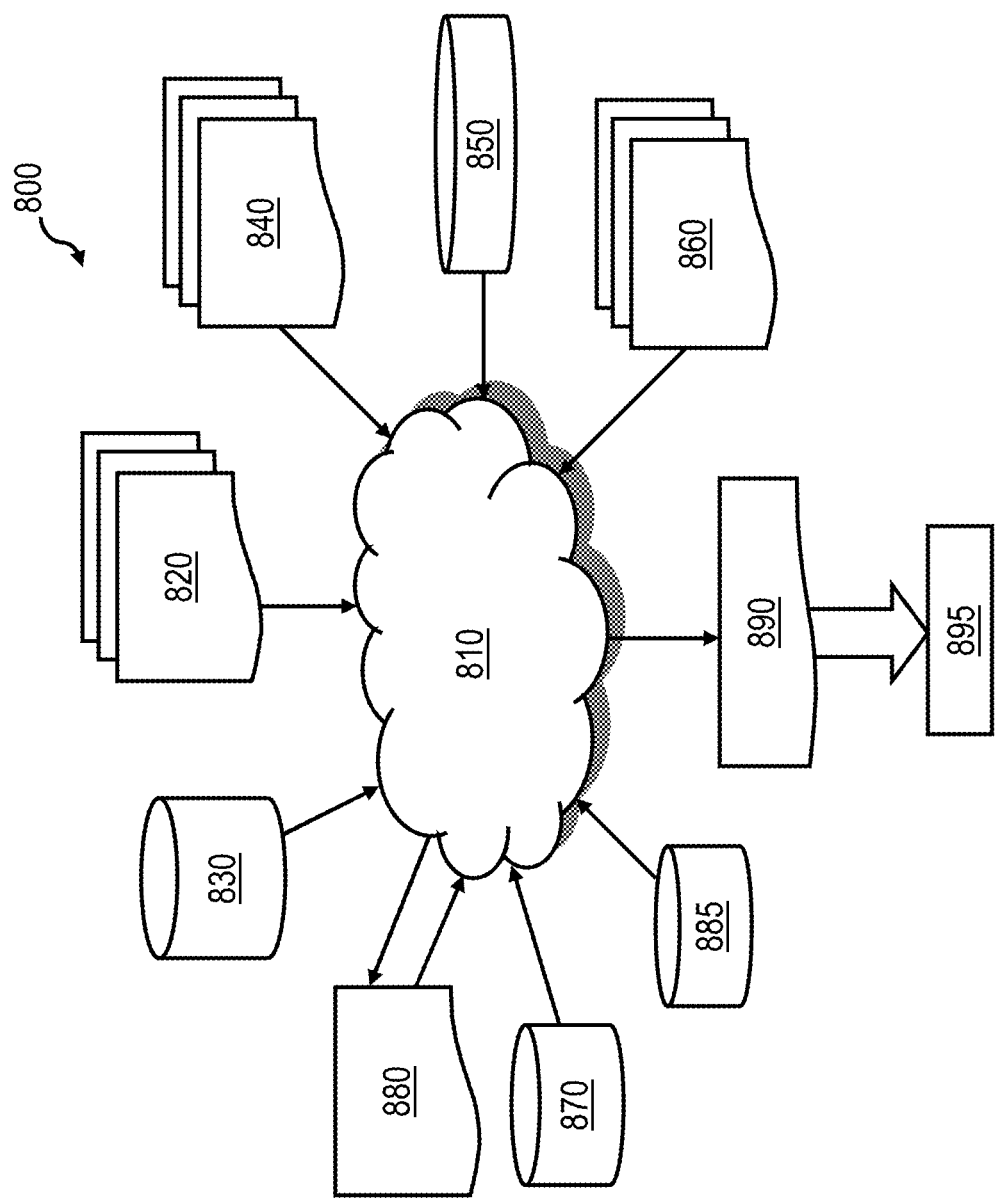
FIG. 8 is a data flow diagram illustrating a design process.

With reference now to FIG. 8, there is depicted a block diagram of an exemplary design flow 800 used for example, in semiconductor IC logic design, simulation, test, layout, and manufacture. Design flow 800 includes processes, machines and/or mechanisms for processing design structures or devices to generate logically or otherwise functionally equivalent representations of the design structures and/or devices described above and shown in FIGS. 1-3. The design structures processed and/or generated by design flow 800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 820 that is preferably processed by a design process 800. Design structure 820 may be a logical simulation design structure generated and processed by design process 800 to produce a logically equivalent functional representation of a hardware device. Design structure 820 may also or alternatively comprise data and/or program instructions that when processed by design process 800, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 800 to simulate or otherwise functionally represent an electronic component, circuit, electronic or logic module, apparatus, device, or system such as those shown in FIGS. 1-3. As such, design structure 820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 800 preferably employs and incorporates hardware and/or software modules for synthesizing, translating, or otherwise processing a design/simulation functional equivalent of the components, circuits, devices, or logic structures shown in FIGS. 1-3 to generate a netlist 880 which may contain design structures such as design structure 820. Netlist 880 may comprise, for example, compiled or otherwise processed data structures representing a list of wires, discrete components, logic gates, control circuits, I/O devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 800 may include hardware and software modules for processing a variety of input data structure types including netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 80 nm, etc.). The data structure types may further include design specifications 840, characterization data 850, verification data 860, design rules 870, and test data files 885 which may include input test patterns, output test results, and other testing information. Design process 800 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 800 without deviating from the scope and spirit of the invention. Design process 800 may also include modules for performing standard circuit design processes such as timing analysis, verification, design rule checking, place and route operations, etc.

Design process 800 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3. In one embodiment, design structure 890 may comprise a compiled, executable HDL simulation model that functionally simulates the devices shown in FIGS. 1-3.

Design structure 890 may also employ a data format used for the exchange of layout data of integrated circuits and/or symbolic data format (e.g., information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3. Design structure 890 may then proceed to a stage 895 where, for example, design structure 890: proceeds to tape-out, is released to manufacturing, is released to a mask house, is sent to another design house, is sent back to the customer, etc.

As has been described, in at least one embodiment, a cache memory includes a data array, a directory of contents of the data array that specifies coherence state information, and snoop logic that processes operations snooped from a system fabric by reference to the data array and the directory. The snoop logic, responsive to snooping on the system fabric a request of a flush or clean memory access operation of an initiating coherence participant, determines whether the directory indicates the cache memory has coherence ownership of a target address of the request. Based on determining the directory indicates the cache memory has coherence ownership of the target address, the snoop logic provides a coherence response to the request that causes coherence ownership of the target address to be transferred to the initiating coherence participant, such that the initiating coherence participant can protect the target address against conflicting requests.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A cache memory of an associated processor core among a plurality of processor cores in a multiprocessor data processing system, said multiprocessor data processing system including a system fabric communicatively coupling the cache memory and a memory controller of a system memory to receive operations on the system fabric, the cache memory comprising:
   a data array;
   a directory of contents of the data array, wherein the directory includes coherence state information; and
   snoop logic that processes operations snooped from the system fabric by reference to the data array and the directory, wherein the snoop logic, responsive to snooping on the system fabric a request of a flush or clean memory access operation of an initiating coherence participant, the request specifying a target address:
      determines whether the directory indicates the cache memory has coherence ownership of the target address;
      based on determining the directory indicates the cache memory has coherence ownership of the target address, provides a coherence response to the request that causes coherence ownership of the target address to be transferred to the initiating coherence participant, such that the initiating coherence participant can protect the target address against conflicting requests.

2. The cache memory of claim 1, wherein the snoop logic is configured to protect the target address against conflicting memory access requests by issuing Retry coherence responses to the conflicting memory access requests.

3. The cache memory of claim 2, wherein the snoop logic, responsive to completing processing of the request, ends its protection of the target address.

4. The cache memory of claim 1, wherein the cache memory provides the coherence response based on the directory indicating a copy of a memory block associated with the target address that is held in the data array is modified with respect to the system memory.

5. The cache memory of claim 1, wherein the memory access operation is a flush operation that causes any modified data associated with the target address to written to the system memory and any cached copies of a memory block associated with the target address to be invalidated.

6. A processing unit, comprising:
   a cache memory according to claim 1; and
   at least one affiliated processor core coupled to the cache memory.

7. A data processing system, comprising:
   a system fabric; and
   a plurality of processing units according to claim 5 all coupled to the system fabric.

8. A design structure tangibly embodied in a machine-readable storage device for designing, manufacturing, or testing an integrated circuit, the design structure comprising:
   a processing unit, including:
      a processor core;
      a cache memory including:
         a data array;
         a directory of contents of the data array, wherein the directory includes coherence state information; and
         snoop logic that processes operations snooped from the system fabric by reference to the data array and the directory, wherein the snoop logic, responsive to snooping on the system fabric a request of a flush or clean memory access operation of an initiating coherence participant, the request specifying a target address:
            determines whether the directory indicates the cache memory has coherence ownership of the target address;
            based on determining the directory indicates the cache memory has coherence ownership of the target address, provides a coherence response to the request that causes coherence ownership of the target address to be transferred to the initiating coherence participant, such that the initiating coherence participant can protect the target address against conflicting requests.

9. The design structure of claim 8, wherein the snoop logic is configured to protect the target address against conflicting memory access requests by issuing Retry coherence responses to the conflicting memory access requests.

10. The design structure of claim 9, wherein the snoop logic, responsive to completing processing of the request, ends its protection of the target address.

11. The design structure of claim 8, wherein the cache memory provides the coherence response based on the directory indicating a copy of a memory block associated with the target address that is held in the data array is modified with respect to the system memory.

12. The design structure of claim 8, wherein the memory access operation is a flush operation that causes any modified data associated with the target address to written to the system memory and any cached copies of a memory block associated with the target address to be invalidated.

13. A method of data processing in a multiprocessor data processing system including a cache memory of an associated processor core among a plurality of processor cores in the multiprocessor data processing system, said multiprocessor data processing system including a system fabric communicatively coupling the cache memory and a memory controller of a system memory to receive operations on the system fabric, the method comprising:
   the cache memory snooping, on the system fabric, a request of a flush or clean memory access operation of an initiating coherence participant, the request specifying a target address;

responsive to snooping the request, the cache memory determining whether a directory of the cache memory indicates the cache memory has coherence ownership of the target address; and based on determining the directory indicates the cache memory has coherence ownership of the target address, the cache memory providing a coherence response to the request that causes coherence ownership of the target address to be transferred to the initiating coherence participant, such that the initiating coherence participant can protect the target address against conflicting requests.

14. The method of claim 13, and further comprising:

the cache memory protecting the target address against conflicting memory access requests by issuing Retry coherence responses to the conflicting memory access requests.

15. The method of claim 14, and further comprising:

the cache memory, responsive to completing processing of the request, ending its protection of the target address.

16. The method of claim 13, wherein the cache memory provides the coherence response based on the directory indicating a copy of a memory block associated with the target address that is held in the data array is modified with respect to the system memory.

17. The method of claim 13, wherein:

the initiating coherence participant, responsive to receipt of coherence ownership of the target address, issuing at least one cleanup command on the system fabric to cause update of system memory with modified data associated with the target address.

18. The method of claim 17, wherein:

the request is a request of a flush memory access operation that requests that any modified data associated with the target address to written to the system memory and any cached copies of a memory block associated with the target address to be invalidated; and the at least one cleanup command further causes invalidation of at least one cached copy of a memory block associated with the target address.

* * * * *